(No Model.)
F. KEMPER & J. H. STUMPE.
CULTIVATOR.
No. 314,136. Patented Mar. 17, 1885.
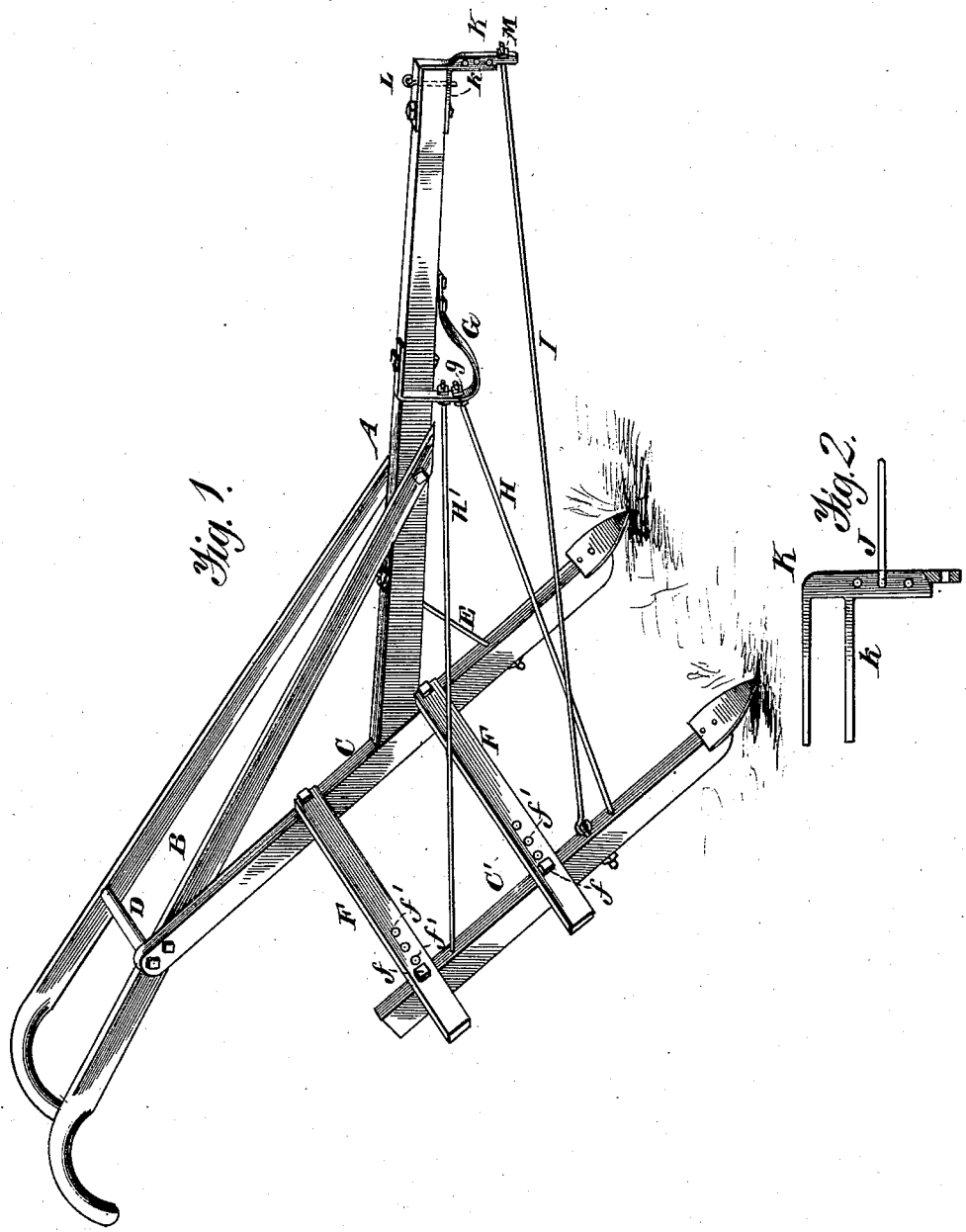
Witnesses.
A. Ruppert.
Alfred T. Gage.
Inventors.
Frank Kemper
J. H. Stumpe
Per
Thomas P. Simpson
attorney.

UNITED STATES PATENT OFFICE.

FRANK KEMPER AND JOHN HENRY STUMPE, OF ST. FLORIAN, ALABAMA.

CULTIVATOR.

SPECIFICATION forming part of Letters Patent No. 314,136, dated March 17, 1885,

Application filed November 13, 1884. (No model.)

*To all whom it may concern:*

Be it known that we, FRANK KEMPER and JOHN HENRY STUMPE, residing at St. Florian, in the county of Lauderdale and State of Alabama, have invented an Improved Cultivator, of which the following is a specification.

The special object of the invention is to enable the plowman and his horse to walk conveniently at the side of the row and do the work thoroughly with the least physical exertion. The means by which we accomplish these objects will first be described in connection with the drawings, and then clearly pointed out in the claim.

Figure 1 of the drawings is an elevation in perspective, and Fig. 2 a detail view of the clevis.

In the drawings, A represents an ordinary beam, made of any suitable material, provided with the handles B, and connecting at the rear with the plow-standard C. The latter is extended up between the handles B B and connected therewith by the round D, while it is securely held below the beam by a bolt, E.

Parallel to standard C, and to one side thereof, I arrange a second standard, C', which is connected with standard C by two cross-bars, F F. At the bottom of these standards may be secured any suitable or preferred form of plow or cultivator tooth.

In order to brace the standard C' so that it may be rigidly held, and, when it works loose, drawn readily into place, we place at the adjacent side of beam A the metallic plate or clip G, which is made fast to said beam. This clip is then connected with the standard C' by the two braces H H', the one above and the other below the middle of standard. The ends of these rods, which are screw-threaded, pass through the plate-clip G, receive a nut on the ends, and preferably have jam-nuts on the outside of clip. By this construction the strain upon the outer standard, C', is transferred in a great measure to the beam A, so that there will be no danger of displacement.

I represents a draft-rod connecting directly with the standard C and with a clevis, K, which is attached to the end of the plow in the usual manner. To this ordinary clevis we have added a side bar, $k$, perforated to receive the draft-hook or link J at different points of adjustment. These holes are made vertically through the side bar, $k$, so as to receive the drop-pin L.

In the outer end of the side bar, $k$, is made a horizontal aperture, through which passes a threaded end of the draft-rod I, on which works a set-nut, M. By this construction it will be perceived that we obviate to a very great extent the side draft, and a direct draft is secured from each of the plow-standards. This enables the horse to work more steadily and easily to keep a uniformly proper distance from the row of plants. It will also be noticed that by means of the rods H H' and the bracket-clip G the standard C' may be set closer to or farther from the standard C, as it is connected with the cross-bars F by detachable pins $f$, and has a series of holes, $f'$. When this is done, the rods are taken up or let out at the clip G by means of the nuts $g$.

By our cultivator's peculiarities of construction and arrangement of parts the man and horse can walk so conveniently beside the row of cotton or other plants that much more and better work can be done with less labor to each of them.

The cotton-cultivator which is now used mostly shoves the plants first to one side and then to the other, while they cover with dirt many of the plants. On the other hand, our cultivator simultaneously works an equal quantity of soil to the plant from each side, so as to preserve its erect position.

Having thus described all that is necessary to a full understanding of our invention, what we desire to protect by Letters Patent is specified in the following claim:

In double-shovel cultivators, the frame consisting of the handled beam A, connected standards C C', brace-rods H H', draft-rod I, clevis K $k$, and clip G, all arranged and connected substantially as shown and described.

FRANK KEMPER.
JH. HENRY STUMPE.

Witnesses:
J. PETER STENZ,
JOHN A. BUFFLER.